United States Patent [19]

Dahl et al.

[11] 4,284,951
[45] Aug. 18, 1981

[54] BATTERY ELECTROLYTE LEVEL SENSOR

[76] Inventors: Ernest A. Dahl, 3247 Breaker Dr., Ventura, Calif. 93003; George H. Barry, 21225 Saratoga Hills Rd., Saratoga, Calif. 95070

[21] Appl. No.: 66,755

[22] Filed: Aug. 15, 1979

[51] Int. Cl.³ ..................... G01F 23/10; G01N 27/06
[52] U.S. Cl. .................. 324/430; 73/304 R; 324/444; 324/436; 320/48
[58] Field of Search ............ 73/304 R; 324/344, 349, 324/430, 443, 436, 446, 449, 448, 432, 65 P; 340/636; 320/48

[56] References Cited

U.S. PATENT DOCUMENTS

| | | | |
|---|---|---|---|
| 1,434,728 | 11/1922 | Arendt et al. | 340/636 X |
| 1,479,087 | 1/1924 | Rice | 324/449 |
| 2,599,413 | 6/1952 | Reichertz | 324/444 |
| 2,654,862 | 10/1953 | Peterson | 324/448 |
| 2,836,808 | 5/1958 | Walker | 340/636 X |
| 2,870,404 | 1/1959 | Oxley | 324/65 R |
| 3,054,047 | 9/1962 | Eckfeldt et al. | 324/446 |
| 3,215,213 | 9/1965 | Ellis | 324/432 X |
| 3,366,943 | 1/1968 | Hart | 324/432 X |
| 3,450,984 | 6/1969 | Holmes | 324/449 |
| 3,659,193 | 4/1972 | Pitsch et al. | 324/444 |
| 3,701,006 | 10/1972 | Vokel et al. | 324/436 X |
| 3,894,278 | 7/1975 | Gerum | 340/636 X |
| 3,922,597 | 11/1975 | Nagase | 323/75 N |
| 4,056,978 | 11/1977 | Zimmermann | 73/304 R |
| 4,182,363 | 1/1980 | Fuller | 73/304 R X |

*Primary Examiner*—Daniel M. Yasich
*Attorney, Agent, or Firm*—Richard S. Sciascia; Joseph M. St.Amand; Wm. C. Daubenspeck

[57] ABSTRACT

Apparatus for indicating the level of the electrolyte in a battery cell. A three-electrode sensor probe having the electrodes partially embedded in an electrically insulating housing suspended in the electrolyte so that a portion of the probe is immersed in the electrolyte. The electrolyte provides the only conduction path between the electrodes so that the resistance between the electrodes varies according to the level of the electrolyte. An AC or pulsed DC sensing signal is applied between two of the electrodes and an output signal related to the level of the electrolyte is produced. A polarizing current is applied to the other electrode to prevent the buildup of surface contamination on the two sensing electrodes due to the sensing signal.

10 Claims, 3 Drawing Figures

BATTERY ELECTROLYTE LEVEL SENSOR

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION

This invention relates in general to battery monitoring devices and, in particular, to a sensor for monitoring the level of the electrolyte in a wet cell battery.

At high charge rates, a portion of the water in the electrolyte of a lead-acid storage cell is lost by electrolysis. If, as a result of this loss and losses by other mechanisms such as evaporation, the electrolyte level drops so low as to expose the surface of the cell electrodes, the cell may be quickly and permanently damaged. On the other hand, if a cell is overwatered prior to the charging of the battery, the electrolyte may overflow during or following charging with deleterious consequences.

Accurate and reliable information about electrolyte level is particularly valuable in cases where high-capacity, many cell battery system provide operating or emergency power such as is the case in a submarine battery system. Typically, the electrolyte level in such systems is monitored by periodic visual inspection of randomly selected cells (if the battery jar is transparent) or by opening the cells and inserting a dip tube to determine the liquid level. Obviously, this approach is of limited effectiveness in detecting problems and is also time consuming. Often the batteries are located in inaccessible areas further complicating the manual monitoring level.

Many methods have been proposed to monitor the level of the electrolyte in a wet cell battery. Generally, these prior methods generate a signal when the liquid in a cell falls below, or rises to, a predetermined level. However, a simple, reliable, and accurate sensor for indicating the instantaneous liquid level which is capable of transmitting the data to a remote location is highly desirable. The present invention is intended to provide such a sensor.

SUMMARY OF THE INVENTION

It is therefore an object of the present invention to provide a continuous indication of the electrolyte level in a wet cell battery.

Another object of the present invention is to provide for remote monitoring of the electrolyte level in a wet cell battery.

A further object of the present invention is to provide apparatus having no moving parts for monitoring the electrolyte level in a wet cell battery.

Another object of the present invention is to monitor the electrolyte level of a wet cell battery without risking the introduction of contaminating substances in the electrolyte.

These and other objects are accomplished in the present invention through the use of a three electrode sensor probe in which the electrodes are partially embedded in an electrically insulating and chemically nonreactive housing. The sensor probe is suspended in the electrolyte so that a portion of probe is immersed in the electrolyte and the electrolyte provides the only conduction path between the electrodes. An AC or pulsed DC sensing signal is applied between two of the three electrodes and an output signal related to the resistance between the two electrodes is produced. Because the conductivity between the electrodes varies according to the level of the electrolyte, the signal is related to the level of the electrolyte. A polarizing current is applied to the other electrode to prevent the buildup of surface contamination on the two sensing electrodes due to the sensing signal.

DESCRIPTION OF THE PREFERRED EMBODIMENT

Figure 1:
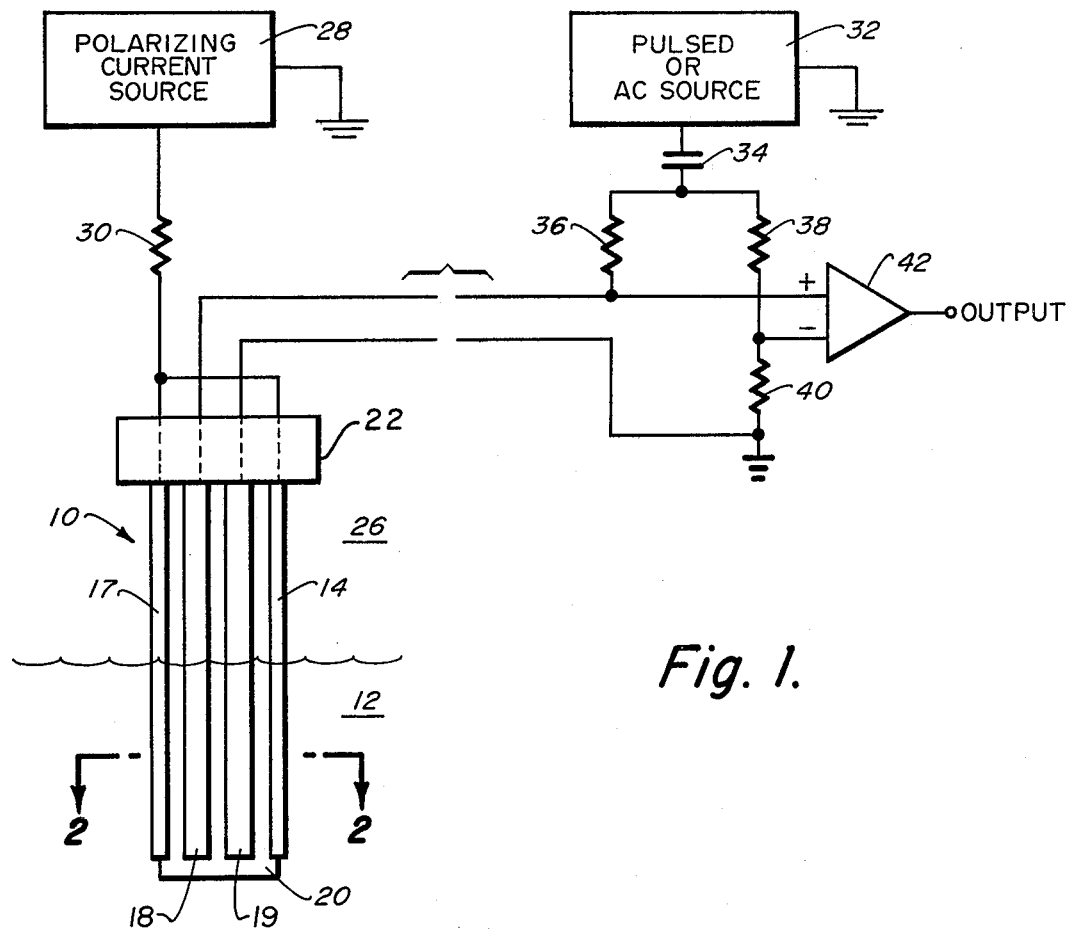
FIG. 1 is a partially schematic, partially pictorial view illustrating the electrolyte level sensor of the present invention.
Figure 2:
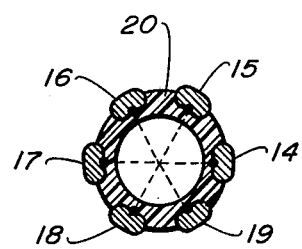
FIG. 2 is a cross-sectional view of the probe utilized in the preferred embodiment as viewed along line 2—2 in FIG. 1.

Referring now to FIG. 1, a sensor probe 10 is shown partially immersed in the electrolyte solution 12 of a wet cell battery. The sensor probe 10 includes six elongated metal bars 14–19 partially embedded in a housing 20. Lead is preferred for use as metal bars 14–19 since it will not be consumed by the electrolyte as will many other metals. The housing 20 is made from an electrically insulating material such as polyethelene which does not chemically react with the electrolyte solution 12. Typically, the top 22 of the housing 20 is adapted to fit into the service cap of the battery cell so that the lower portion of the sensor probe 10 may be suspended in the electrolyte solution. The elongated bars 14–19 are disposed symmetrically about the circumference of the housing 20, as best shown in the cross-sectional view of FIG. 2, and are embedded so that a portion of the surface of each bar 14–19 is exposed to the ambient environment (i.e., either the electrolyte solution 12 or the atmosphere 26). The bars 14–19 are electrically coupled (by connections represented in FIG. 2) in pairs to form three electrodes. The bars disposed opposing each other (14 and 17, 15 and 18, and 16 and 19 forming a first, second, and third electrode, respectively) are joined so that the fingers of the electrodes are interspaced.

A polarizing current source 28 is coupled via a current limiting resistor 30 to the first electrode formed by bars 14 and 17. A sensing voltage source 32 which may be either a pulse source or an AC source is coupled via a DC blocking capacitor 34 through a first resistor 36 to the second electrode formed by bars 15 and 18. The sensing voltage source 32 is also coupled via capacitor 34 through a second resistor 38 and a third resistor 40 (which are connected in series) to the third electrode formed by bars 16 and 19. A differential amplifier 42 has its first input coupled between the first resistor 36 and the first electrode and its second input coupled between the second resistor 38 and the third resistor 40.

In operation the electrolyte solution 12 provides a conduction path between the three electrodes. Since the three electrodes are otherwise electrically insulated from each other by the housing 20, the electrolyte solution 12 provides the only conduction path between the electrodes. Thus, the conductivity between electrodes depends on the presence of the electrolyte solution 12 and varies according to the level of the electrolyte solution. As the electrolyte level rises and falls, thereby increasing or decreasing the surface area of the electrodes in contact with the electrolyte 12, the conductivity between the electrodes increases or decreases accordingly.

Figure 3:
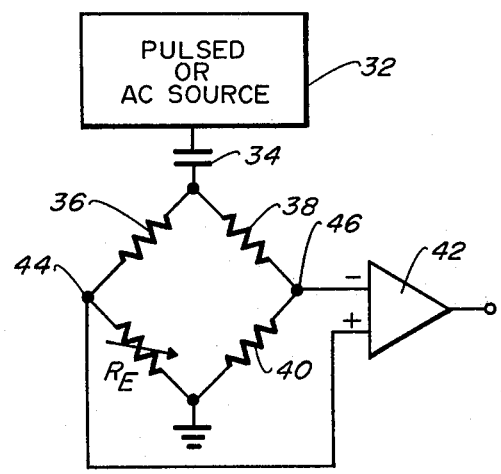
FIG. 3 is a schematic diagram illustrating the operation of the present invention.

The second electrode (bars 15 and 18) and the third electrode (bars 16 and 19) serve as sensing electrodes in determining the level of the electrolyte. The second and third electrodes are coupled to resistors 36, 38 and 40 so that the resistance between the electrodes is one arm of a resistance bridge formed by the electrodes and resistors 36, 38 and 40. As illustrated in FIG. 3, a voltage (pulse or AC) is applied through capacitor 34 and resistor 36 to the second electrode and the electrolyte provides a conduction path to the third electrode. Since the conductivity between the electrodes varies according to the level of the electrolyte, the resistance between the electrodes, identified by variable resistance $R_E$, varies inversely with the level of the electrolyte. The voltage between terminals 44 and 46, the plus and minus inputs to the differential amplifier 42, then varies as the resistance $R_E$ between the second and third electrodes varies according to the level of the electrolyte 12. The voltage is amplified in the differential amplifier 42 which provides an output signal which varies inversely with the level of the electrolyte.

In the typical application, the electrolyte level sensor will be empirically calibrated by suspending the sensor probe 10 in the electrolyte and noting the output of amplifier 42 for various levels of the electrolyte. The gain of the amplifier 42 may be adjusted to provide an output voltage level appropriate for measurement by the many applicable measuring devices.

Because the resistance between the sensor electrodes depends not only on the electrolyte level, but also on the surface chemistry of the electrodes, it is necessary to prevent the buildup of a contaminating layer (lead sulfate) on the two sensing electrodes. It is therefore preferable to sense the resistance $R_E$ with alternating current or with pulses having no direct current component since a direct current component will produce a net charge on the battery cell comprising the sensing electrodes and cause a change in the surface composition. The polarizing current source 28, typically a voltage source having its positive terminal coupled to the first electrode (bars 14 and 17) and negative terminal coupled to ground, supplies a low (typically 5 $\mu$amp) current through current-limiting resistor 30 to the first electrode to remove the contaminating layer which may otherwise accumulate on the two sensing electrodes due to the battery action. It has been found that a sensing pulse of 5 volts and a duration as brief as 200 $\mu$sec will deleteriously effect the surface chemistry of the electrodes.

For remote sensing of the output of the differential amplifier 42, the preferred method is to convert the output voltage to a frequency in a voltage controlled oscillator. The signal may then be transmitted as a frequency over relatively long distances thereby avoiding the undesirable effects of leakage currents, voltage drops and induced noise which may occur in long cables carrying AC or DC signals.

It should be noted that the inter-spaced electrode arrangement of the sensor probe 10 in the preferred embodiment is not required. The first, second and third electrodes may each be a single metal bar. The inter-spaced electrode arrangement was designed for the measurement of the height of an electrolyte fountain in a large wet cell battery having an air-lift circulation pump. The inter-spaced electrode sensor may be suspended in the fountain of electrolyte from the circulation pump to provide a more uniform and accurate reading of fountain height as it plays on the surface of the sensor. The circulation of the electrolyte may be inferred from the height of the fountain since this measurement indicates status of the air-lift circulation pump.

Obviously many modifications and variations of the present invention are possible in the light of the above teachings. It is therefore to be understood that within the scope of the appended claims the invention may be practiced otherwise than as specifically described.

What is claimed is:

1. Apparatus for indicating the level of electrolyte in a battery cell comprising:
   a. a probe including: an elongated housing of an electrically insulating material which is chemically nonreactive with battery electrolyte; six elongated metal bars embedded longitudinally in said housing in a substantially parallel arrangement around the perimeter of said housing, the outer surface of each said bar protruding from said housing to expose each said protruding surface to the ambient environment, said bars being electrically coupled in pairs to form first, second and third electrodes; said first, second and third electrodes being spaced apart from each other and disposed vertically in a battery cell so that only a portion of the surface area of each electrode is in contact with battery electrolyte, the amount of the surface area of said second and third electrodes in contact with battery electrolyte varying as the level of electrolyte in the battery cell varies;
   b. a source of electric potential coupled between said second and third electrodes;
   c. a polarizing current source coupled to the first electrode; said polarizing current source providing a current which operates to prevent the buildup of a contaminating layer on the surface of the second and third electrodes due to said second and third electrodes functioning as a battery whenever said source of electric potential has a direct current component that produces a net charge on said second and third electrodes; and
   d. means for providing a signal proportional to the resistance between said second electrode and said third electrode through the electrolyte, said resistance varying inversely with the amount of surface area of said second and third electrodes which is in contact with the electrolyte.

2. Apparatus for indicating the level of electrolyte in a battery cell, comprising:
   a. an elongated probe including an elongated housing of an electrically insulating material which is chemically nonreactive with battery electrolyte, and at least three elongated metal bars embedded longitudinally in said housing in a substantially parallel arrangement around the perimeter of said housing, the outer surface of each said bar protruding from said housing to expose the protruding surface of said bar to the ambient environment, said at least three bars being electrically coupled to form a first electrode, a second electrode and a third electrode;
   b. a source of electric potential coupled between said second and third electrodes;
   c. a polarizing current source coupled to the first electrode; said polarizing current source providing a current which operates to prevent the buildup of a contaminating layer on the surface of the second and third electrodes due to said second and third electrodes functioning as a battery whenever said source of electric potential has a direct current component which produces a net charge on said second and third electrodes; and d. means for providing a signal proportional to the resistance between said second and third electrodes including:

a differential amplifier means having a first input, a second input, and an output;

a first resistance means coupled between the positive terminal of said source of electric potential and said second electrode;

a second resistance means coupled between the third electrode and the first input to said differential amplifier means;

a third resistance means coupled between the positive terminal of said source of electric potential and the first input to said differential amplifier; and the second input of said differential amplifier being coupled between said first resistance means and said second electrode;

the output of said differential amplifier means being related to the resistance between said second and third electrodes;

e. said probe being disposed vertically in a battery cell so that only a portion of the surface area of each electrode which is exposed to the ambient environment is in contact with the electrolyte, the amount of the surface area in contact with the electrolyte varying as the level of the electrolyte in the cell varies.

3. Apparatus as recited in claim 1 wherein said six elongated metal bars are electrically coupled in pairs and adjacent bars are not electrically coupled.

4. Apparatus as recited in claim 3 wherein said means for providing a signal proportional to the resistance between said second and third electrodes through the electrolyte comprises:

a. differential amplifier means having a first input, a second input, and an output;

b. first resistance means coupled between the positive terminal of said source of electric potential and said second electrode;

c. second resistance means coupled between the third electrode and the first input of said differential amplifier means;

d. third resistance means coupled between the positive terminal of said source of electric potential and the first input to said differential amplifier; and e. the second input of said differential amplifier being coupled between said first resistance means and said second electrode, the output of said differential amplifier proportional to the resistance between said second and third electrode and varying as the resistance between said electrodes varies.

5. The apparatus as recited in claim 1 or 2 wherein a D.C. blocking capacitor is coupled between the positive terminal of said source of electric potential and said first resistance means and said third resistance means.

6. The apparatus as recited in claims 1 or 2 wherein said source of electric potential provides pulses having substantially no D.C. component.

7. The apparatus as recited in claims 1 or 2 wherein said source of electric potential has substantially no D.C. component.

8. Apparatus as recited in claims 1 or 2 wherein said source of electric potential coupled between said second and third electrodes is a source of AC potential.

9. Apparatus is recited in claims 1 or 2 wherein said polarizing current source is a voltage source having its positive terminal coupled to the first electrode through a current limiting resistor and its negative terminal coupled to ground.

10. Apparatus as recited in claim 9 wherein said polarizing current source supplies a current of approximately 5 microamperes.

* * * * *